(12) United States Patent
Wang et al.

(10) Patent No.: US 9,740,908 B2
(45) Date of Patent: Aug. 22, 2017

(54) CAPACITIVE FINGERPRINT SENSOR AND PACKAGE METHOD THEREOF

(71) Applicant: CONTEK LIFE SCIENCE CO., LTD., Taipei (TW)

(72) Inventors: Chein-Hsun Wang, Hsin-Chu (TW); Yen Ju Lo, New Taipei (TW)

(73) Assignee: CONTEK LIFE SCIENCE CO., LTD., Taipei (TW)

( * ) Notice: Subject to any disclaimer, the term of this patent is extended or adjusted under 35 U.S.C. 154(b) by 17 days.

(21) Appl. No.: 14/936,104

(22) Filed: Nov. 9, 2015

(65) Prior Publication Data

US 2017/0132448 A1    May 11, 2017

(51) Int. Cl.
*G06K 9/00* (2006.01)
*G06F 21/32* (2013.01)

(52) U.S. Cl.
CPC ......... *G06K 9/00013* (2013.01); *G06F 21/32* (2013.01); *G06K 9/0002* (2013.01); *G06K 9/00053* (2013.01)

(58) Field of Classification Search
CPC .. G06K 9/0002; G06K 9/00053; G06K 19/07; G06K 19/0716; G06F 21/32
USPC ......................................................... 382/124
See application file for complete search history.

(56) References Cited

U.S. PATENT DOCUMENTS

| | | | | |
|---|---|---|---|---|
| 6,011,859 A * | 1/2000 | Kalnitsky | .......... | G06K 9/00053 382/100 |
| 6,667,439 B2 * | 12/2003 | Salatino | ............... | G06K 9/0002 174/565 |
| 6,762,470 B2 * | 7/2004 | Siegel | ................ | G06K 9/00053 257/414 |
| 7,518,200 B2 * | 4/2009 | Chou | ................. | G06K 9/00053 257/415 |
| 7,606,398 B2 * | 10/2009 | Nysæther | ............. | G06K 9/0002 382/124 |
| 7,969,422 B2 * | 6/2011 | Gruhlke | ............... | G06F 3/03547 345/173 |
| 8,499,434 B2 * | 8/2013 | Misra | ................... | G06K 9/0002 29/592.1 |
| 9,058,511 B2 * | 6/2015 | Chou | ................... | G06K 9/0002 |
| 9,396,379 B2 * | 7/2016 | Slogedal | ............. | G06K 9/0002 |

* cited by examiner

*Primary Examiner* — Kanjibhai Patel
(74) *Attorney, Agent, or Firm* — Muncy, Geissler, Olds & Lowe, P.C.

(57) ABSTRACT

A capacitive fingerprint sensor includes a plate, a frame, a capacitive fingerprint sensor chip and a package body. The plate comprises a first surface, an opposite second surface and a plurality of first conductive pads arranged on the first surface. A plurality of second conductive pads and third conductive pads are respectively arranged on opposite surfaces of the frame, wherein the second conductive pads are electrically connected with the corresponding first conductive pads and third conductive pads. The capacitive fingerprint sensor chip is disposed at the central area of the frame by a flip chip manner and electrically connected with the first conductive pads. The package body is filled in the central area of the frame to cover the chip. The above-mentioned sensor has a flat sensing surface with wear resistance and better ESD toleration. A package method of the above-mentioned sensor is also disclosed.

22 Claims, 3 Drawing Sheets

CAPACITIVE FINGERPRINT SENSOR AND PACKAGE METHOD THEREOF

BACKGROUND OF THE INVENTION

1. Field of the Invention

The present invention relates to a fingerprint sensor and package method thereof, and more particularly to a capacitive fingerprint sensor and package method thereof.

2. Description of the Prior Art

The principle of capacitive fingerprint sensor is to detect a capacitance variation between ridges and valleys of human finger. Normal depth of the valley is around 20-35 μm with air filled which has dielectric constant of 1. The dielectric constant of human tissue is about 4-8. Therefore minute capacitance variation can be detected by the capacitive fingerprint sensor. Package requirements for capacitive fingerprint sensor are: flat surface with wear resistance, ESD toleration and stiffness.

FIG. 1 shows a cross sectional view of conventional package for capacitive fingerprint sensor. A capacitive sensor chip 120 is attached to a substrate 110. Gold wires 130 are used to make connection between bonding pads 121 of the capacitive fingerprint chip 120 and a lead frame 111 on substrate 110. After chip attachment and wire bonding, the whole chip is molded with a high dielectric filler 140. However, during molding process, the difference of thermal expansion coefficient between the capacitive fingerprint chip 120 and the filler 140 will cause die mark or warpage, as the height difference H shown in FIG. 1. Besides, the filler 140 mixed with high dielectric compound has particle size in several μm range that cause surface roughness of the filler 140 greater than 2 μm and reduce sensing sensitivity. Furthermore, the wire bond loop section (as dashed circle shown in FIG. 1) is more susceptible to electrostatic discharge (ESD) breakdown.

Accordingly, it is highly desirable to provide a capacitive fingerprint sensor having a flat surface with wear resistance and better ESD toleration.

SUMMARY OF THE INVENTION

The present invention is directed to a capacitive fingerprint sensor and package method thereof, wherein a capacitive fingerprint sensor chip is packaged on a plate by a flip-chip manner, so that a flat sensing surface with wear resistance can be obtained by selecting an appropriate material of the plate or treating the surface appropriately, and the sensor has better ESD toleration.

In one embodiment, the proposed package method of capacitive fingerprint sensor includes: providing a plate comprising a first surface, an opposite second surface and a plurality of first conductive pads, wherein at least one of the first surface and the second surface is flattened, and the first conductive pads are arranged on the first surface; providing a frame comprising a third surface, an opposite fourth surface, a plurality of second conductive pads and a plurality of third conductive pads, wherein the second conductive pads are arranged on the third surface, the third conductive pads are arranged on the fourth surface, and the second conductive pads are electrically connected with the corresponding third conductive pads; disposing the frame on the first surface of the plate with the third surface, wherein the second conductive pads are electrically connected with the corresponding first conductive pads, and the first conductive pads extend to a central area of the frame; disposing a capacitive fingerprint sensor chip at the central area of the frame, wherein the capacitive fingerprint sensor chip has an active surface and an opposite back surface, and the active surface of the capacitive fingerprint sensor chip faces the first surface of the plate and is electrically connected with the first conductive pads; and filling a package body in the central area of the frame to cover the capacitive fingerprint sensor chip.

In another embodiment, the proposed capacitive fingerprint sensor includes a plate, a frame, a capacitive fingerprint sensor chip and a package body. The plate comprises a first surface, an opposite second surface and a plurality of first conductive pads, wherein at least one of the first surface and the second surface is flattened, and the first conductive pads are arranged on the first surface. The frame comprises a third surface, an opposite fourth surface, a plurality of second conductive pads and a plurality of third conductive pads and disposed on the first surface of the plate with the third surface, wherein the second conductive pads and the third conductive pads are respectively arranged on the third surface and the fourth surface, the second conductive pads are electrically connected with the corresponding first conductive pads and the corresponding third conductive pads, and the first conductive pads extend to a central area of the frame. The capacitive fingerprint sensor chip is disposed at the central area of the frame, wherein the capacitive fingerprint sensor chip has an active surface and an opposite back surface, and the active surface of the capacitive fingerprint sensor chip faces the first surface of the plate and is electrically connected with the first conductive pads. The package body is filled in the central area of the frame to cover the capacitive fingerprint sensor chip.

The objective, technologies, features and advantages of the present invention will become apparent from the following description in conjunction with the accompanying drawings wherein certain embodiments of the present invention are set forth by way of illustration and example.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein.

DESCRIPTION OF THE PREFERRED EMBODIMENT

Various embodiments of the present invention will be described in detail below and illustrated in conjunction with the accompanying drawings. In addition to these detailed descriptions, the present invention can be widely implemented in other embodiments, and apparent alternations, modifications and equivalent changes of any mentioned embodiments are all included within the scope of the present invention and based on the scope of the Claims. In the descriptions of the specification, in order to make readers have a more complete understanding about the present invention, many specific details are provided; however, the present invention may be implemented without parts of or all the specific details. In addition, the well-known steps or elements are not described in detail, in order to avoid unnecessary limitations to the present invention. Same or similar elements in Figures will be indicated by same or similar reference numbers. It is noted that the Figures are schematic and may not represent the actual size or number of the elements. For clearness of the Figures, some details may not be fully depicted.

Figure 1:
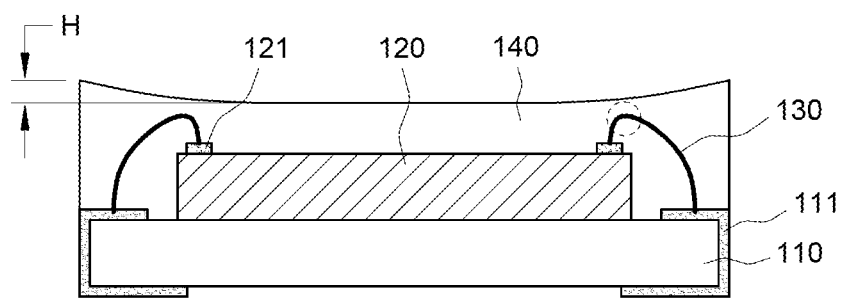
FIG. 1 is a diagram schematically illustrating a capacitive fingerprint sensor according to a prior art.
Figure 2:
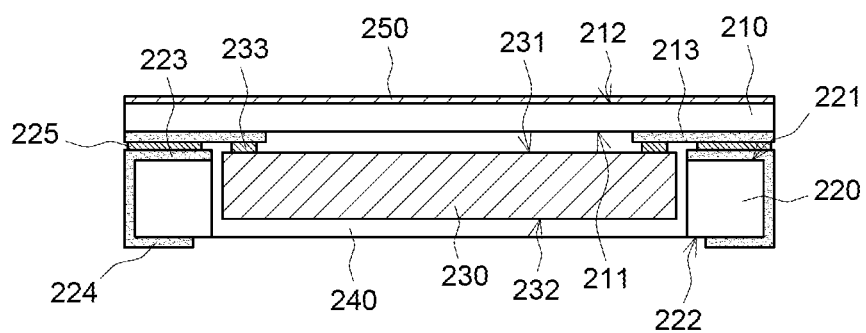
FIG. 2 is a diagram schematically illustrating a capacitive fingerprint sensor according to an embodiment of the present invention.

Referring to FIG. 2, a capacitive fingerprint sensor according to an embodiment of the present invention comprises a plate 210, a frame 220, a capacitive fingerprint sensor chip 230 and a package body 240. The plate 210 comprises a first surface 211, a second surface 212 opposite to the first surface 211 and a plurality of first conductive pads 213, wherein at least one of the first surface 211 and the second surface 212 is flattened, such as polishing. The first conductive pads 213 are arranged on the first surface 211 of the plate 210. For example, the first surface 211 of the plate 210 can be partially metalized to form a required wire connection and pads.

The frame 220 comprises a third surface 221, an fourth surface 222 opposite to the third surface 221, a plurality of second conductive pads 223 and a plurality of third conductive pads 224, wherein the second conductive pads 223 are arranged on the third surface 221 of the frame 220, the third conductive pads 224 are arranged on the fourth surface 222 of the frame 220, and the second conductive pads 223 are electrically connected with the corresponding third conductive pads 224. In the embodiment shown in FIG. 2, the second conductive pads 223 and the third conductive pads 224 are electrically connected to each other through traces arranged on the outer surface of the frame 220. But it is not limited thereto, and other connections also enables the second conductive pads 223 and the third conductive pads 224 electrically connected to each other, such as through interconnections penetrating the third surface 221 and the fourth surface 222 of the frame 220. The frame 220 is disposed on the first surface 211 of the plate 210, wherein the third surface 221 of the frame 220 faces the first surface 211 of the plate 210, so that the second conductive pads 223 on the third surface 221 are electrically connected with the corresponding first conductive pads 213 on the plate 210. For example, the frame 220 and the plate 210 are bound with a plurality of solder bumps 225 to make the second conductive pads 223 electrically connect to the corresponding first conductive pads 213. It should be noted that the first conductive pads 213 on the first surface 211 of the plate 210 extend to a central area of the frame 220 so that the first conductive pads 213 are not covered by the frame 220.

The capacitive fingerprint sensor chip 230 is disposed at the central area of the frame 220 and bound on the first surface 211 of the plate 210. The capacitive fingerprint sensor chip 230 has an active surface 231 and a back surface 232 opposite to the active surface 231. The active surface 231 of the capacitive fingerprint sensor chip 230 faces the first surface 211 of the plate 210 and is electrically connected with the corresponding first conductive pads 213 so that the capacitive fingerprint sensor chip 230 can be electrically connected to an exterior circuit through the first conductive pads 213 on the plate 210 and the second conductive pads 223 and the third conductive pads 224 of the frame 220. For example, the capacitive fingerprint sensor chip 230 is bound on the first surface 211 of the plate 210 with a plurality of solder bumps 233 to make the capacitive fingerprint sensor chip 230 electrically connect to the corresponding first conductive pads 213 on the first surface 211. The package body 240 is filled in the central area of the frame 220 to cover the capacitive fingerprint sensor chip 230.

According to the structure of the capacitive fingerprint sensor of the present invention, it can be understood that the thickness and dielectric constant of the plate 210 will affect the sensing sensitivity of the capacitive fingerprint sensor. In one embodiment, a thickness range of the plate 210 is between 50 µm to 200 µm; a dielectric constant of the plate 210 is greater than 7. In preferred embodiment, the plate can be made of materials with better wear resistance, such as sapphire, silicon, germanium, glass (e.g., the preferred glass with dielectric constant greater than 6) or Zirconia, wherein silicon wafers are the most commercial available and easy to process during thin down.

Referring to FIG. 2 again, in one embodiment, the capacitive fingerprint sensor of the present invention further comprises a coating layer 250 which is disposed on the second surface 212 of the plate 210. For example, the coating layer 250 may be a diamond like carbon (DLC) film to enhance wear resistance of the sensing surface of the capacitive fingerprint sensor. Alternatively, the coating layer 250 may be a layer with nano ceramic particles to enhance hydrophobic and oleophobic properties of the sensing surface of the capacitive fingerprint sensor.

Figure 3A:
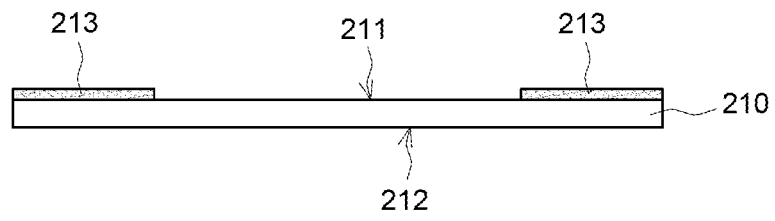
FIG. 3a to FIG. 3d are diagrams schematically illustrating a package method of capacitive fingerprint sensor according to an embodiment of the present invention.

Referring to FIGS. 3a-3d, a package method of capacitive fingerprint sensor is schematically illustrated. Firstly, a plate 210 is provided, wherein the plate 210 comprises a first surface 211, a second surface 212 opposite to the first surface 211 and a plurality of first conductive pads 213, and the first conductive pads 213 are arranged on the first surface 211, as shown in FIG. 3a. In one embodiment, at least one of the first surface 211 and the second surface 212 is flattened. In preferred embodiment, both of the first surface 211 and the second surface 212 are flattened. For example, the flattening process can be implemented by polishing or other appropriate techniques. In one embodiment, the surface roughness of the flattened first surface 211 or the flattened second surface 212 is less than 0.5 µm.

Figure 3B:
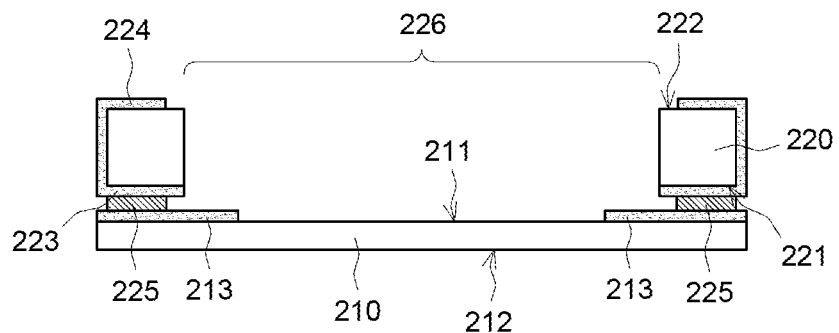

Referring to FIG. 3b, next, a frame 220 is provided. The frame 220 comprises a third surface 221, a fourth surface 222 opposite to the third surface 221, a plurality of second conductive pads 223 and a plurality of third conductive pads 224, wherein the second conductive pads 223 are arranged on the third surface 221, the third conductive pads 224 are arranged on the fourth surface 222, and the second conductive pads 223 are electrically connected with the corresponding third conductive pads 224. In one embodiment, the frame 220 can be made of low temperature co-fired ceramic (LTCC). Next, the frame 220 is bound on the first surface 211 of the plate 210 with the third surface 221 to make the second conductive pads 223 on the third surface 221 electrically connect to the corresponding first conductive pads 213 on the plate 210. For example, a plurality of solder bumps 225 are disposed on the second conductive pads 223 of the frame 220, and then the solder bumps 225 are aligned to the first conductive pads 213 on the plate 210 so that the frame 220 can be soldered to the plate 210 by heater and the second conductive pads 223 of the frame 220 can be electrically connected with the first conductive pads 213 on the plate 210. In one embodiment, the material of the solder bumps 225 may be gold, alloy of gold-tin, nickel-tin or gold-indium. It should be noted that the first conductive pads 213 on the first surface 211 of the plate 210 extend to a central area 226 of the frame 220 so that the first conductive pads 213 are not covered by the frame 220.

Figure 3C:
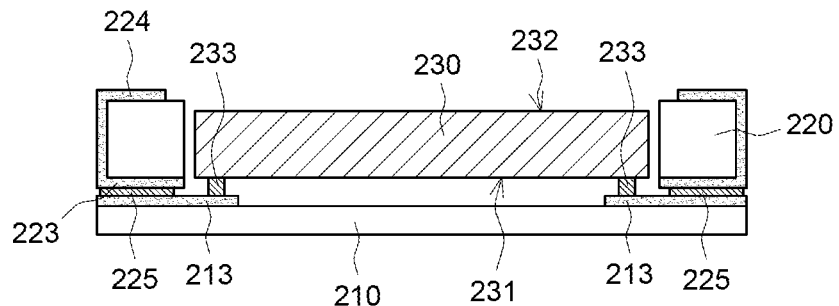

Next, a capacitive fingerprint sensor chip 230 is disposed at the central area 226 of the frame 220. As shown in FIG. 3c, the capacitive fingerprint sensor chip 230 is disposed on the first surface 211 of the plate 210 by a flip-chip manner, which means the active surface 231 of the capacitive fingerprint sensor chip 230 faces the first surface 211 of the plate 210 and is electrically connected with the first conductive pads 213 on the plate 210. In one embodiment, a plurality of solder bumps 233 are disposed on the active surface 231 of the capacitive fingerprint sensor chip 230, and then the solder bumps 233 on the active surface 231 are aligned to the first conductive pads 213 on the plate 210 so that the capacitive fingerprint sensor chip 230 can be bound on the first surface 211 of the plate 210 by heater and the solder bumps 233 on the active surface 231 can be electrically connected with the first conductive pads 213 on the plate 210.

Figure 3D:
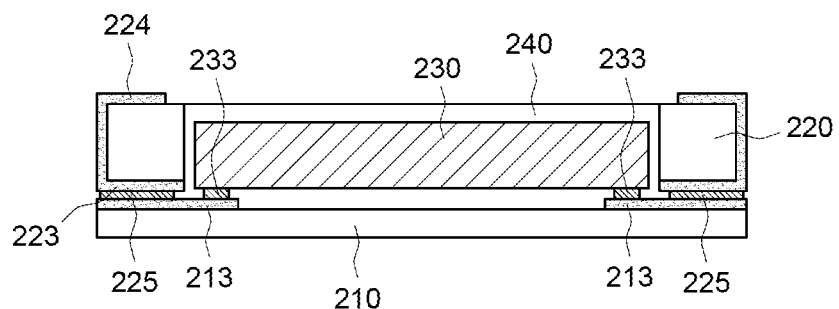
Figure 4:
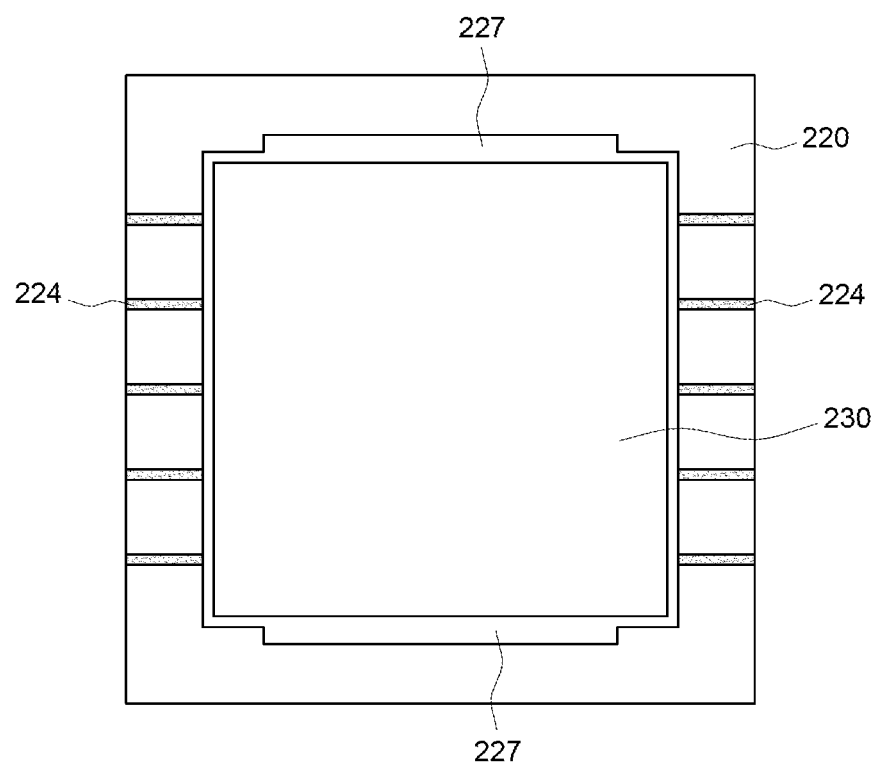
FIG. 4 is a diagram schematically illustrating a capacitive fingerprint sensor according to another embodiment of the present invention.

Referring to FIG. 3d, finally, a package body 240 is filled in the central area 226 of the frame 220 to cover the capacitive fingerprint sensor chip 230 and then cured. For example, the package body 240 may be an epoxy. It can be understood that since the frame 220 performs confinement of the package body 240 when it is cured and cool down, the surface of the whole chip can maintain flat without warpage. In one embodiment, the package method of capacitive fingerprint sensor of the present invention further comprises the step of filling a filling material between the plate 210 and the capacitive fingerprint sensor chip 230 and then curing the filling material. In one embodiment, the filling material is low viscosity to facilitate filling in between the plate 210 and the capacitive fingerprint sensor chip 230. Referring to FIG. 4, for example, a trench 227 is disposed on the inner surface of the frame 220, thus, the filling material with low viscosity can pass through the trench 227 between the frame 220 and the capacitive fingerprint sensor chip 230 to fill in between the plate 210 and the capacitive fingerprint sensor chip 230. In one embodiment, the dielectric constant of the filling material is greater than 3.5.

It can be understood that a coating layer 250, such as a diamond like carbon (DLC) film or a layer with nano ceramic particles, can be pre-coated on the second surface 212 of the plate 210, and the structure shown in FIG. 2 is achieved to enhance the surface properties (such as wear resistance or hydrophobic/oleophobic properties) of the sensing surface of the capacitive fingerprint sensor. For example, the coating layer 250 can be formed on the second surface 212 of the plate 210 by chemical vapor deposition (CVD).

To summarize the foregoing descriptions, the capacitive fingerprint sensor chip is packaged on a plate by a flip-chip manner in the capacitive fingerprint sensor and package method thereof according to the present invention, so that a flat sensing surface of the capacitive fingerprint sensor can be obtained and the sensing sensitivity is enhanced by selecting the plate material with wear resistance and high dielectric constant and polishing the surface of the plate. Preferably, a coating layer is formed on the sensing surface to adjust surface properties of the sensing surface. Furthermore, the wire bond loop can be avoided by flip-chip package, therefore, the capacitive fingerprint sensor of the present invention has better ESD toleration.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the scope of the appended claims.

What is claimed is:

1. A package method of capacitive fingerprint sensor, comprising:

provding a plate comprising a first surface, an opposite second surface and a plurality of first conductive pads, wherein at least one of the first surface and the second surface is flattened, and the first conductive pads are arranged on the first surface;

providing a frame comprising a third surface, an opposite fourth surface, a plurality of second conductive pads and a plurality of third conductive pads, wherein the second conductive pads are arranged on the third surface, the third conductive pads are arranged on the fourth surface, and the second conductive pads are electrically connected with the corresponding third conductive pads;

disposing the frame on the first surface of the plate with the third surface, wherein the second conductive pads are electrically connected with the corresponding first conductive pads, and the first conductive pads extend to a central area of the frame;

disposing a capacitive fingerprint sensor chip at the central area of the frame, wherein the capacitive fingerprint sensor chip has an active surface and an opposite back surface, and the active surface of the capacitive fingerprint sensor chip faces the first surface of the plate and is electrically connected with the first conductive pads; and filling a package body in the central area of the frame to cover the capacitive fingerprint sensor chip.

2. The package method of capacitive fingerprint sensor according to claim 1, wherein a thickness range of the plate is between 50 µm to 200 µm.

3. The package method of capacitive fingerprint sensor according to claim 1, wherein a dielectric constant of the plate is greater than 7.

4. The package method of capacitive fingerprint sensor according to claim 1, wherein the first surface and the second surface of the plate are flattened.

5. The package method of capacitive fingerprint sensor according to claim 1, wherein surface roughness of the first surface or the second surface of the plate is less than 0.5 µm.

6. The package method of capacitive fingerprint sensor according to claim 1, wherein the plate comprises sapphire, silicon, germanium, glass or zirconia.

7. The package method of capacitive fingerprint sensor according to claim 1, wherein the plate and the frame are electrically connected with a plurality of solder bumps, and a material of the solder bumps comprises gold, alloy of gold-tin, nickel-tin or gold-indium.

8. The package method of capacitive fingerprint sensor according to claim 1, wherein the second surface of the plate comprises a diamond like carbon (DLC) film or a layer with nano ceramic particles.

9. The package method of capacitive fingerprint sensor according to claim 1, wherein a material of the frame comprises low temperature co-fired ceramic (LTCC).

10. The package method of capacitive fingerprint sensor according to claim 1, further comprising:

filling a filling material between the plate and the capacitive fingerprint sensor chip.

11. The package method of capacitive fingerprint sensor according to claim 10, wherein a dielectric constant of the filling material is greater than 3.5.

12. A capacitive fingerprint sensor, comprising:
- a plate comprising a first surface, an opposite second surface and a plurality of first conductive pads, wherein at least one of the first surface and the second surface is flattened, and the first conductive pads are arranged on the first surface;
- a frame comprising a third surface, an opposite fourth surface, a plurality of second conductive pads and a plurality of third conductive pads and disposed on the first surface of the plate with the third surface, wherein the second conductive pads and the third conductive pads are respectively arranged on the third surface and the fourth surface, the second conductive pads are electrically connected with the corresponding first conductive pads and the corresponding third conductive pads, and the first conductive pads extend to a central area of the frame;
- a capacitive fingerprint sensor chip disposed at the central area of the frame, wherein the capacitive fingerprint sensor chip has an active surface and an opposite back surface, and the active surface of the capacitive fingerprint sensor chip faces the first surface of the plate and is electrically connected with the first conductive pads; and
- a package body filled in the central area of the frame to cover the capacitive fingerprint sensor chip.

13. The capacitive fingerprint sensor according to claim 12, wherein a thickness range of the plate is between 50 μm to 200 μm.

14. The capacitive fingerprint sensor according to claim 12, wherein a dielectric constant of the plate is greater than 7.

15. The capacitive fingerprint sensor according to claim 12, wherein the first surface and the second surface of the plate are flattened.

16. The capacitive fingerprint sensor according to claim 12, wherein surface roughness of the first surface or the second surface of the plate is less than 0.5 μm.

17. The capacitive fingerprint sensor according to claim 12, wherein the plate comprises sapphire, silicon, germanium, glass or zirconia.

18. The capacitive fingerprint sensor according to claim 12, wherein the plate and the frame are electrically connected with a plurality of solder bumps, and a material of the solder bumps comprises gold, alloy of gold-tin, nickel-tin or gold-indium.

19. The capacitive fingerprint sensor according to claim 12, wherein the second surface of the plate comprises a diamond like carbon (DLC) film or a layer with nano ceramic particles.

20. The capacitive fingerprint sensor according to claim 12, wherein a material of the frame comprises low temperature co-fired ceramic (LTCC).

21. The capacitive fingerprint sensor according to claim 12, further comprising:
- a filler filled between the plate and the capacitive fingerprint sensor chip.

22. The capacitive fingerprint sensor according to claim 21, wherein a dielectric constant of the filler is greater than 3.5.

* * * * *